(12) United States Patent
Kuan et al.

(10) Patent No.: US 6,246,210 B1
(45) Date of Patent: Jun. 12, 2001

(54) SYSTEM FOR IDENTIFYING ELECTRIC DEVICES

(75) Inventors: Leo Kuan; Shyh-Ren Kuo, both of Taipei (TW)

(73) Assignee: Behavior Tech Computer Corp., Taipei (TW)

( * ) Notice: Subject to any disclaimer, the term of this patent is extended or adjusted under 35 U.S.C. 154(b) by 0 days.

(21) Appl. No.: 09/492,036

(22) Filed: Jan. 27, 2000

(51) Int. Cl.[7] .......................................................... H02J 7/00
(52) U.S. Cl. ................................................................ 320/106
(58) Field of Search ................................ 320/106; 702/63

(56) References Cited

U.S. PATENT DOCUMENTS

| | | | |
|---|---|---|---|
| 5,587,924 | * 12/1996 | Rossi | 703/63 |
| 5,912,544 | * 6/1999 | Miyakawa et al. | 320/106 |
| 5,945,803 | * 8/1999 | Brotto et al. | 320/106 |

\* cited by examiner

*Primary Examiner*—Peter S. Wong
*Assistant Examiner*—Gregory J. Toatley, Jr.
(74) *Attorney, Agent, or Firm*—Rosenberg, Klein & Lee

(57) ABSTRACT

A system for identifying electric device includes a charging/discharging circuit comprised of at least one electric capacitor and one additional electric element, such as an electric resistor or an electric inductance. The charging/discharging circuit is connected to at least one input/output port of a central processing unit and has a particular charging/discharging characteristics based on values of the capacitor and the resistor or the inductance. The particular charging/discharging characteristics provides an identification code of the device. The identification code may be used to identify a particular product in for example a communication link between a central processing unit of a host machine and a peripheral device or be used to identify a particular model of products manufactured in a manufacturing line whereby the same facility may be used to manufacture different models of products thereby effectively reducing the manufacturing costs.

7 Claims, 2 Drawing Sheets

SYSTEM FOR IDENTIFYING ELECTRIC DEVICES

FIELD OF THE INVENTION

The present invention generally relates to a system for identifying electric devices.

BACKGROUND OF THE INVENTION

Nowadays, most of electric devices, especially computer-related devices, are made in an OEM or ODM fashion. A factory may produce a number of similar devices for different retail companies. To distinguish products for different retain companies, additional selection of hardware or additional software is usually needed to suit the requirement of different retail companies. This causes problems for the OEM or ODM manufacturers.

Furthermore, with the development of high speed transmission interface, such as Universal Serial Bus (USB), and wireless communication between electric devices, identification of a particular device in communication with a CPU is severely required in order to avoid any undesired confusion and mistake.

Thus, it is desired to have a system for readily identifying a particular electric device both in a manufacturing line and in operation.

SUMMARY OF THE INVENTION

Accordingly, an object of the present invention is to provide a system for identifying an electric device.

In accordance with the present invention, a system for identifying an electric device comprises electric resistor(s) and electric capacitor(s) forming a discharging/charging circuit connected to input/output port(s) of a central processing unit (CPU), wherein the particular values of the resistance and capacity provide a unique identification code for the particular device. Such an identification code may be used to distinguish/identify products of different models manufactured in the same manufacturing line thereby allowing products of different models to be manufactured with the same manufacturing facility and thus effectively reducing manufacturing cost. The identification code may be used to identify a particular downstream device in a communication link between a CPU of a host machine and at least one downstream device (a peripheral device).

By using the system of the present invention, electric products of different models or different retail companies or different systems may be readily identified. Hardware and software for manufacturing may be shared by products of different models and manufacturing cost is reduced.

BRIEF DESCRIPTION OF THE DRAWINGS

The present invention will be apparent to those skilled in the art by reading the following description of preferred embodiments thereof, with reference to the accompanying drawings, in which.

DETAILED DESCRIPTION OF THE PREFERRED EMBODIMENT

A system for identifying electric device in accordance with the present invention comprises electric elements, such as electric resistor and electric capacitor, connected to input/output port(s) of a central processing unit (CPU) of the electric device to be identified. The electric resistor(s) and the capacitor(s) connected to the input/output port(s) have particular values of resistance and capacity. The capacitor and the resistor form a charging/discharging circuit displaying particular discharging characteristics. Based on the resistance and the capacity of the resistor and the capacitor, a particular value, which will be referred to as identification code, may be obtained from the discharging characteristics thereof which gives a particular identification of the electric device. By varying the values of the resistor and the capacitor, each electric device may be identified by a particular identification code that is determined during the manufacture thereof.

Apparently, the resistor(s) of the charging/discharging circuit may be replaced by electric inductance.

Figure 1:
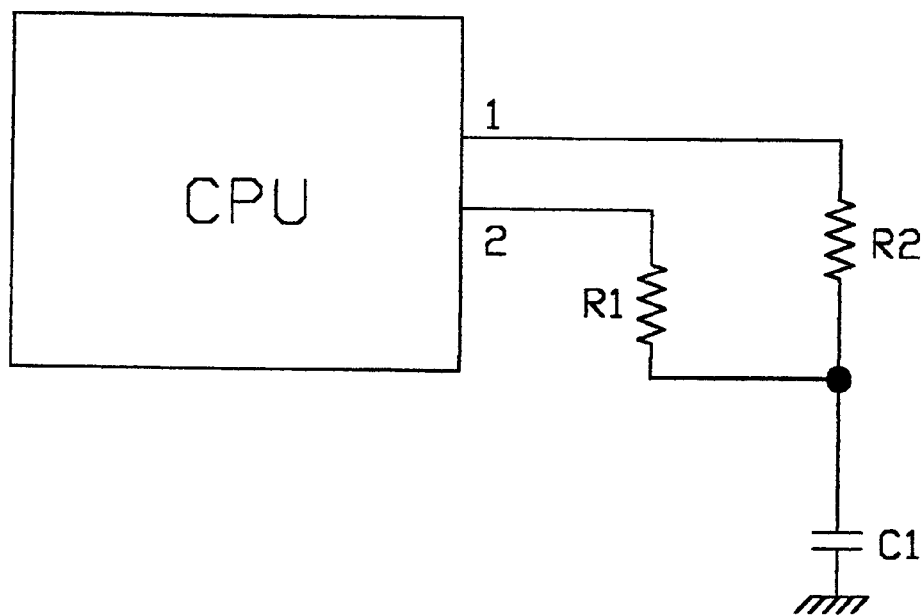
FIG. 1 is a schematic view of a first embodiment of the present invention.

FIG. 1 shows a first embodiment in accordance with the present invention. The charging/discharging circuit comprises two resistors R1, R2 respectively connected to two input/output ports 1, 2 of a CPU and a capacitor C1 serially connected to both resistors R1, R2. Based on the charging/discharging characteristics, for example the charging/discharging time thereof, an identification code may be obtained.

Figure 2:
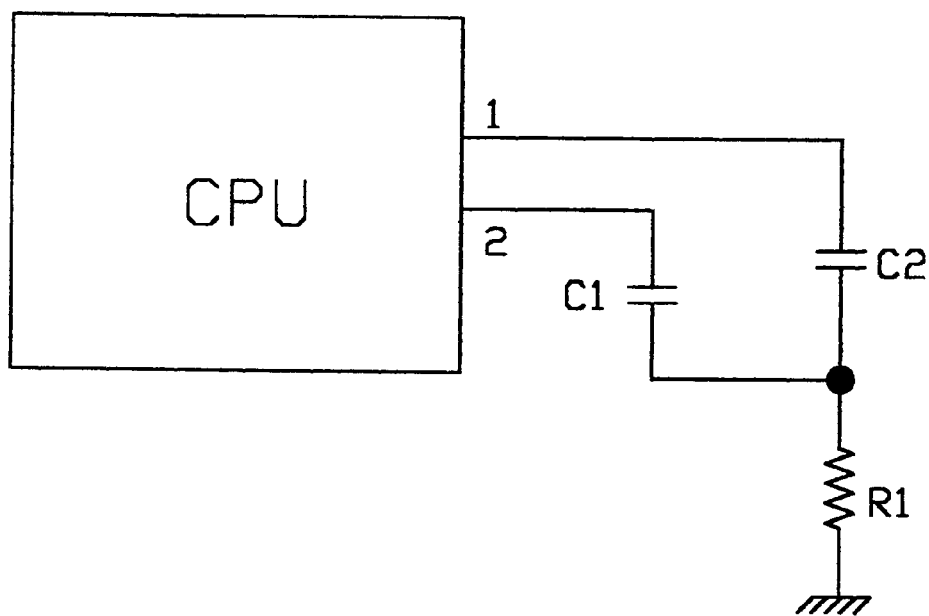
FIG. 2 is a schematic view of a second embodiment of the present invention.

FIG. 2 shows a second embodiment in accordance with the present invention. The charging/discharging circuit comprises two capacitors C1, C2 respectively connected to two input/output ports 1, 2 of a CPU and a resistor R1 serially connected to both capacitors C1, C2. Based on the charging/discharging characteristics, for example the charging/discharging time thereof, an identification code may be obtained.

Figure 3:
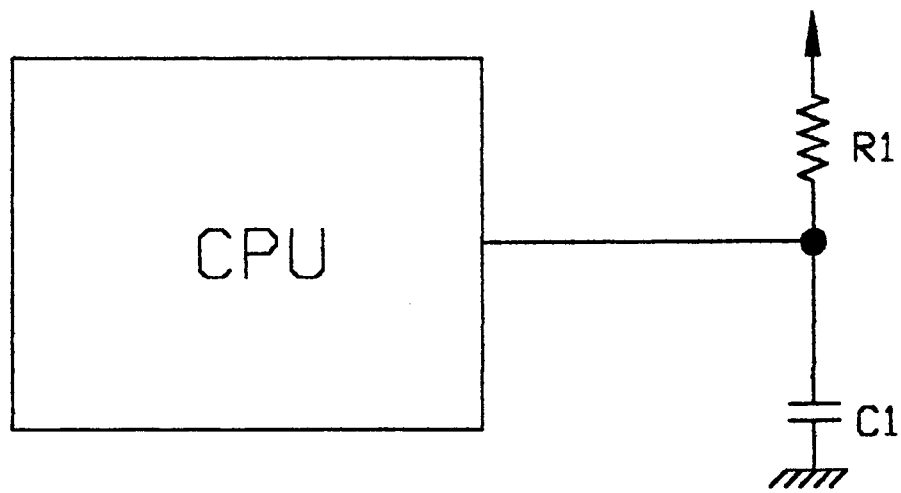
FIG. 3 is a schematic view of a third embodiment of the present invention.

FIG. 3 shows a third embodiment in accordance with the present invention. A resistor R1 and a capacitor C1 are serially connected to each other with an input/output port of a CPU connected to the connection of the resistor R1 and the capacitor C1. The capacitor C1 is grounded. The capacitor C1 is discharged first and then re-charged and an absolute value may obtained in accordance with the charging time thereof. Different resistance and capacities provide different absolute value for selection of different data or software thereby allowing different data/program to be deposited in the same memory.

Figure 4:
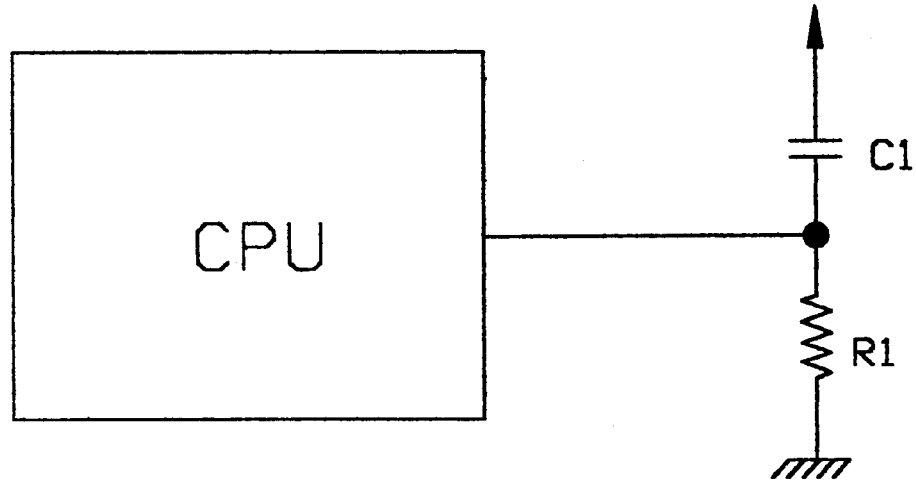
FIG. 4 is a schematic view of a fourth embodiment of the present invention.

FIG. 4 shows a fourth embodiment in accordance with the present invention. Similar to the third embodiment, a resistor R1 and a capacitor C1 are serially connected to each other with an input/output port of a CPU connected to the connection thereof. The resistor R1 is grounded. The capacitor is charged first and then discharged and an absolute value may obtained in accordance with the discharging time thereof. Different resistance and capacities provide different absolute value for selection of different data or software thereby allowing different data/program to be deposited in the same memory.

The system may be widely used in a variety of applications, such as selection of user ID of a USB keyboard, selection of ID of a wireless keyboard, selection of key code of a multi-medium device and electric devices of different models or different retail companies manufactured in the same manufacturing line.

The present invention makes use of the charging/discharging characteristics (charging/discharging time) to provide identifications for a variety of devices without significant modification of hardware facility. This is particularly suitable for manufacturing products of minor differences therebetween. Products of different models or systems may use the same software thereby reducing the cost and enhancing management of manufacture.

Each individual product, such as a USB keyboard or a wireless keyboard, may be identified by establishing a unique ID code in accordance with the present invention. Thus, operation of the products may be enhanced.

Although the present invention has been described with respect to the preferred embodiment, it is contemplated that a variety of modifications, variations and substitutions may be done without departing from the scope of the present invention that is intended to be defined by the appended claims.

What is claimed is:

1. A system for identifying an electric device comprising a central processing unit and a charging/discharging circuit connected to at least one input/output port of the central processing unit, the charging/discharging circuit including at least one electric capacitor and one additional electric element, the charging/discharging circuit having a particular charging/discharging time based on values of the capacitor and the additional electric element, the particular charging/discharging time providing an identification code for the device.

2. The system as claimed in claim 1, wherein the additional electric element comprises an electric resistor.

3. The system as claimed in claim 1, wherein the additional electric element comprises an electric inductance.

4. The system as claimed in claim 1, wherein the additional electric element is a resistor and the charging/discharging circuit comprises the capacitor and the resistor serially connected together, the input/output port of the central processing unit being connected to a connection node between the capacitor and the resistor, the capacitor being discharged first and then recharged to provide the particular charging time thereof.

5. The system as claimed in claim 1, wherein the additional electric element is a resistor and the charging/discharging circuit comprises the capacitor and the resistor serially connected together, the input/output port of the central processing unit being connected to a connection node between the capacitor and the resistor, the capacitor being charged first and then discharged to provide the particular discharging time thereof.

6. A system for identifying an electric device comprising a central processing unit and a charging/discharging circuit connected to two input/output port of the central processing unit, the charging/discharging circuit comprises two resistors respectively connected to the two input/output ports of the central processing unit and a capacitor connected to both resistors, the charging/discharging circuit respectively establishing a particular charging/discharging characteristic at each of the two input/output ports based on the resistor and capacitor values, the particular charging/discharging characteristic of the two input/output ports providing an identification code of the device.

7. A system for identifying an electric device comprising a central processing unit and a charging/discharging circuit connected to two input/output port of the central processing unit, the charging/discharging circuit comprises two capacitors respectively connected to the two input/output ports of the central processing unit and a resistor connected to both capacitors, the charging/discharging circuit respectively establishing a particular charging/discharging characteristic at each of the two input/output ports based on the capacitor and resistor values, the particular charging/discharging characteristic of the two input/output ports providing an identification code of the device.

* * * * *